United States Patent

[11] 3,629,627

| [72] | Inventors | Gene L. Dafler<br>New Lebanon;<br>Wayne V. Fannin, Dayton, both of Ohio |
| --- | --- | --- |
| [21] | Appl. No. | 52,556 |
| [22] | Filed | July 6, 1970 |
| [45] | Patented | Dec. 21, 1971 |
| [73] | Assignee | General Motors Corporation<br>Detroit, Mich. |

[54] COOLING ARRANGEMENT FOR A DYNAMOELECTRIC MACHINE
3 Claims, 7 Drawing Figs.

[52] U.S. Cl. ..................................................... 310/54,
310/68 D
[51] Int. Cl. ............................................................ H02k 9/00
[50] Field of Search............................................ 310/52, 54,
68 D, 61, 71, 68 R, 58

[56] References Cited
UNITED STATES PATENTS

| 3,249,775 | 5/1966 | Baylac............................ | 310/54 |
| --- | --- | --- | --- |
| 3,189,769 | 6/1965 | Willyoung..................... | 310/52 |
| 3,371,235 | 2/1968 | Hoover........................... | 310/68 R |
| 3,145,314 | 8/1964 | Becker........................... | 310/54 X |
| 3,457,440 | 7/1969 | Horsley......................... | 310/52 |

*Primary Examiner*—J. D. Miller
*Assistant Examiner*—Mark O. Budd
*Attorneys*—E. W. Christen, C. R. Meland and Robert W. Smith

ABSTRACT: A dynamoelectric machine cooling arrangement is disclosed for a brushless alternating current generator including an integral rectifier assembly. Rotating parts mounted on the machine shaft are cooled by annular pools of liquid coolant which are circulated around annular supporting portions of the rotating parts. A rectifier support wheel mounted on the shaft has an annular cooling chamber. Heat sinks for supporting radially oriented semiconductor diodes are mounted within the annular chamber and are cooled by an annular pool of coolant supplied by a coolant flow directed over the semiconductor diodes. Coil end turn supports mounted on the shaft include annular reservoirs for containing annular pools of coolant with a coolant flow being directed thereto form radial passages provided in the shaft.

INVENTORS
Gene L. Dafler &
Wayne V. Fannin
BY
Robert W. Smith
ATTORNEY

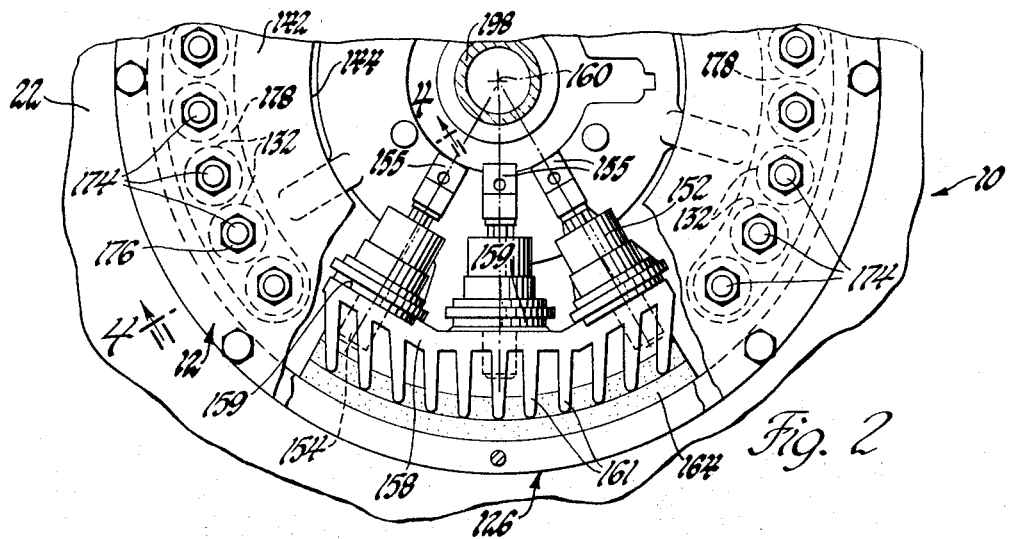
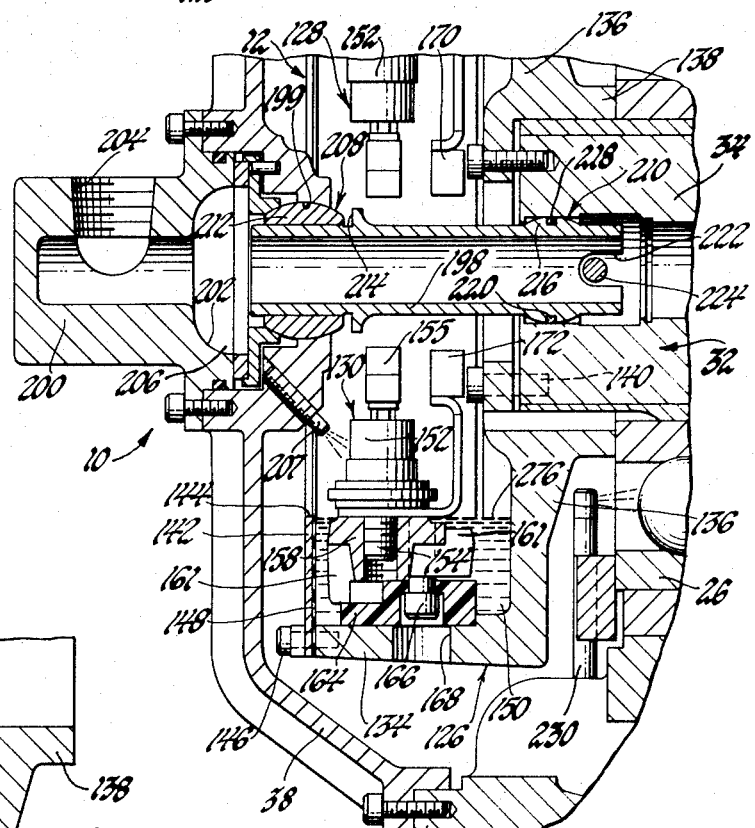
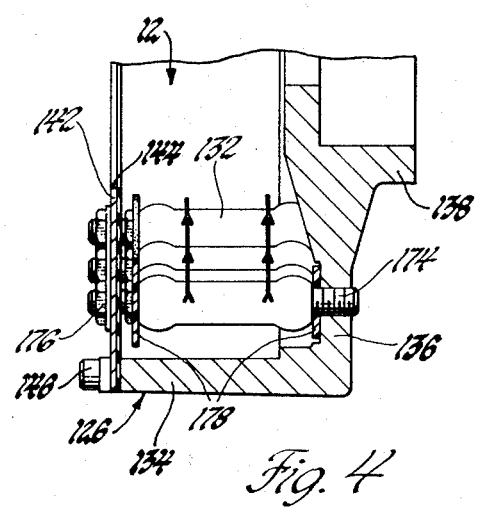

INVENTORS
Gene L. Dafler &
BY Wayne V. Fannin
Robert W. Smith
ATTORNEY

COOLING ARRANGEMENT FOR A DYNAMOELECTRIC MACHINE

This invention relates to a cooling arrangement for a dynamoelectric machine and more particularly to a liquid cooling arrangement for a brushless alternating current generator which includes an integral exciter generator and rectifier assembly for supplying direct current field current to the main generator.

It is well known that when a dynamoelectric machine is required to operate for extended periods under high load conditions excessive temperatures can develop and it is desirable to withdraw this heat from the relatively moving parts thereof. Cooling of the machines increases the reliable operating life and also the efficiency and output capacity of the machine. Various cooling and ventilating systems have been employed in dynamoelectric machines in order to provide the most efficient cooling of various component parts in an economical manner.

In one general field of dynamoelectric machine cooling, to which the present invention is directed, a liquid coolant is circulated through the machine so that heat is transferred to the coolant. In U.S. Pat. No. 3,239,701 issued Mar. 8, 1966, and assigned to the assignee of the present invention, a liquid cooling system for an alternating current generator is described and claimed in which a plurality of spray nozzles are positioned adjacent a rotor assembly and a shaft-mounted rectifier assembly. Liquid coolant is sprayed onto these assemblies for maintaining the heat developed therein below a desired temperature. In U.S. Pat. No. 3,439,201 issued Apr. 15, 1969, and assigned to the assignee of the present invention, a further liquid cooling system is disclosed and claimed for a dynamoelectric machine having a shaft assembly including an axial bore communicating with a chamber formed between a rotor assembly and the shaft. A liquid coolant is circulated through the axial bore and chamber for conducting heat from the rotor assembly. This patent further discloses a stator assembly having an annular chamber formed around the outside of the stator core wherein a liquid coolant is circulated to transfer heat from the stator assembly.

In the present inventioN, a cooling arrangement is provided for a dynamoelectric machine of the type including an alternating current generator having a main alternating current generator, an exciter alternating current generator and a rectifier assembly. A liquid coolant is directed both externally and internally of the shaft which carries the rectifier assembly and the main and exciter generator rotor assemblies. The rectifier assembly is mounted in a rectifier support wheel which is supported on the end of the shaft and includes an interior annular cooling chamber. When liquid coolant is applied to the chamber while the shaft is rotating, the coolant is thrown outwardly by centrifugal forces to fill the annular chamber thereby forming a circulating annular pool of coolant. Heat sinks supporting semiconductor diodes of the rectifier assembly are immersed by the annular pool of coolant. Heat developed by the diodes is transferred to the coolant from the heat sinks and the heated coolant is discharged from the support wheel by incoming coolant flow due to a so-called thermal-siphoning effect. This is caused by changes in the density of the coolant with temperature change. A rotor assembly carried by the shaft includes a pair of coil end turn supports having annular reservoirs formed on the inner peripheries thereof which encircle the shaft. These reservoirs are aligned with radially disposed shaft passages communicating with an axial bore in the shaft which is connected to a supply of liquid coolant. An annular pool of coolant is formed by coolant flow from the radial passages and is maintained in the reservoir by centrifugal forces as the shaft rotates.

A primary object of this invention is to provide an improved cooling arrangement for rotating parts of a dynamoelectric machine wherein an annular pool of liquid coolant is provided by the coolant being thrown outward around a supporting part mounted on the machine shaft so as to bathe a peripheral surface of the part as it is rotated.

A further object of this invention is to provide a cooling arrangement for a dynamoelectric machine having a rectifier assembly carried on the machine shaft by a rectifier support wheel having an annular chamber including heat sinks which support semiconductor diodes wherein the annular chamber is filled with a liquid coolant as the shaft rotates.

A still further object of this invention is to provide a cooling arrangement for a dynamoelectric machine including a rectifier support wheel carried by the machine shaft for supporting a rectifier assembly having a pair of heat sinks for carrying two groups of radially disposed semiconductor diodes wherein the heat sinks are mounted within an annular chamber formed inside of the support wheel so as to contain an annular pool of coolant when the shaft is rotating and a flow of coolant is directed to the interior of the support wheel.

A still further object of this invention is to provide a cooling arrangement for a dynamoelectric machine including a rotor assembly which includes coil supports wherein inner peripheral surfaces of the supports are formed with annular reservoirs that are filled with a liquid coolant by centrifugal forces which cause the coolant to circulate in the reservoirs.

And a still further object of this invention is to provide a cooling arrangement for an alternating current generator assembly including a main generator, an exciter generator and a rectifier assembly having shaft mounted rotor parts which are cooled by circulating a liquid coolant through the shaft so as to transfer heat developed in the rotor parts and in which the coolant is directed to coil end turn support rings from radial passages in the shaft to form a shallow pool of liquid coolant around the inner peripheries of the rotor windings.

Further objects and advantages of the present invention will be apparent from the following description, reference being had to the accompanying drawings wherein a preferred embodiment of the present invention is clearly shown.

IN THE DRAWINGS

FIG. 2 is a sectional end view taken along line 2—2 of FIG. 1.

FIG. 3 is an enlarged fragmentary sectional view of a portion of the generator illustrated in FIG. 1.

FIG. 4 is a fragmentary view taken along line 4—4 of FIG. 2.

Figure 1:
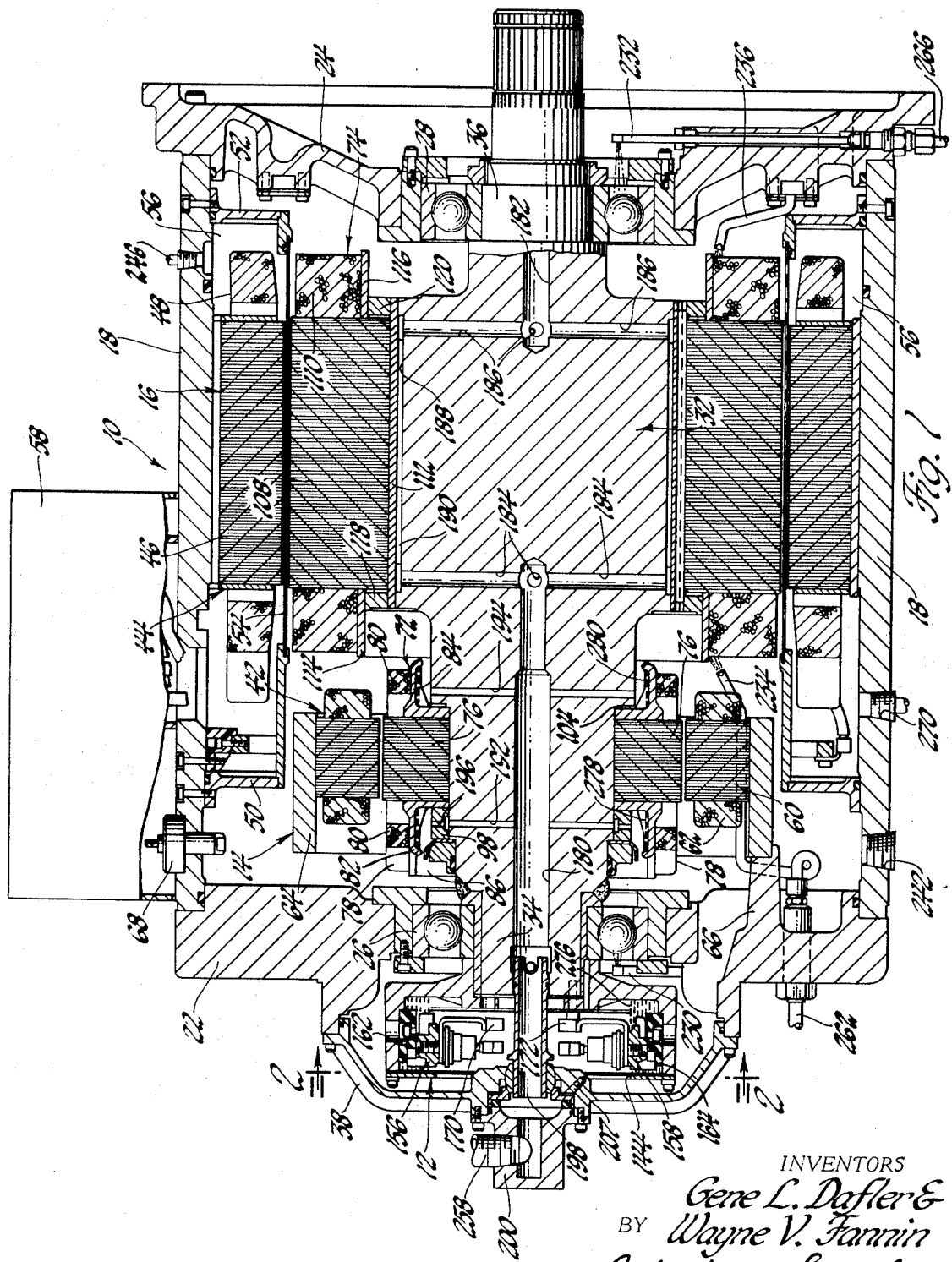
FIG. 1 is a sectional view of an alternating current generator including main and exciter generators and a rectifier assembly including a cooling arrangement made in accordance with this invention.

Referring now to the drawings and more particularly to FIG. 1, the reference numeral 10 generally designates a dynamoelectric machine of the brushless alternating current generator type made in accordance with the present inventioN. In one preferred embodiment the dynamoelectric machine 10 is employed as an electrical power source developing alternating current for supplying induction drive motors of an electrically powered off-highway or earth-moving-type vehicle. The electrical parts of the machine 10 generally include a rectifier assembly 12, alternating current exciter generator 14 and an alternating current main generator 16.

A liquidtight machine housing is formed by an annular frame 18 having end frame sections 22 and 24 secured to the left-hand and right-hand ends, respectively, of the frame 18 as it is viewed in FIG. 1. The end frame sections 22 and 24 include center openings supporting the outer races of bearing assemblies 26 and 28, respectively.

A shaft 32 supporting the rotating parts of the dynamoelectric machine 10 includes ends 34 and 36 having reduced diameters and journaled for rotation in the inner races of the bearing assemblies 26 and 28, respectively. The shaft end 36 extends externally of the machine housing and is driven by a suitable means such as by an internal combustion engine, not shown. The engine is coupled through a gearing assembly mounted in a casing attached to the end frame section 24. The shaft end 34 extends slightly beyond the end frame section 22 and terminates within a housing end cover 38 which is mounted on the end frame section 22. The rectifier assembly 12 is carried by the shaft end 34 and within the end cover 38 as described further hereinbelow.

The stators 42 and 44 of the exciter generator 14 and main generator 16, respectively, are mounted inside of the annular frame 18 with the stator 42 being supported by the end frame section 22 and the stator 44 supported by the annular frame 18. The stator 44 includes a laminated core 46 which carries a three-phase wye-connected output winding 48. A pair of annular bulkheads 50 and 52 mounted on the annular frame 18 and a cylindrical sleeve 54 extending therebetween and made of an insulation material form an annular cooling chamber 56 surrounding the stator 44. The cylindrical sleeve 54 is made of glass fibers embedded in an insulating filler material such as an epoxy resin. The cylindrical sleeve 54 is bonded to the inner diameter of the stator core 46 by a suitable adhesive such as an epoxy composition. Wire conductors connected to the output winding 48 extend from the chamber 56 to terminals provided in a terminal box 58 mounted on the outside of the frame 18.

The stator 42 of the exciter generator 14 includes eight laminated pole pieces 60 carrying the exciter field winding 62. The pole pieces 60 are mounted on a cylindrical yoke 64 mounted to an axially extending flange 66 provided on the end frame section 22. The exciter field winding 62 is connected to a source of direct current through terminals designated 68 mounted on the outside of the annular frame 18 and within the terminal box 58.

Referring now to the rotating parts of the machine 10, rotors 72 and 74 of the exciter generator 14 and main generator 16, respectively, are carried by the shaft 32 radially adjacent the associated stators 42 and 44. The rotor 72 of the exciter generator 14 includes a laminated core 76 which supports an alternating current output winding 78. Coils forming the exciter output winding 78 are connected in a three-phase wye configuration. The coil end turns, partially shown in the cross-sectioned portions of the winding 78, extend axially from the ends of the core 76 and are provided with a band of glass insulating tape wound around the outer diameters thereof. The inner diameters of the end turns 80 are supported by a pair of coil end turn support rings 82 and 84 made of nonmagnetic stainless steel material.

Figure 5:
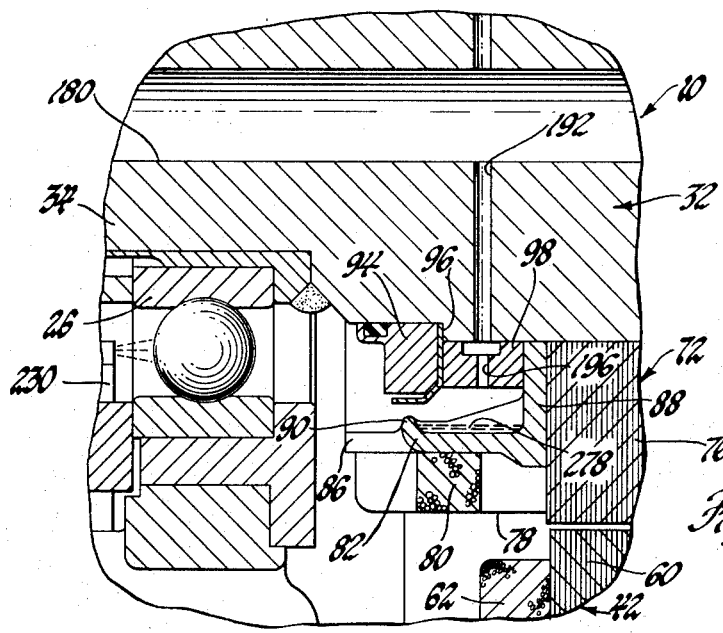
FIG. 5 is an enlarged fragmentary view of a portion of the generator illustrated in FIG. 1.

FIG. 5 illustrates an enlarged cross-sectional view of the lower portion of the coil support ring 82 which is described in detail hereinafter. It is to be understood that there are corresponding parts provided on the coil support ring 84 except for an axial extension 86 formed on the support ring 82. A radially inwardly projecting flange portion 88 is carried by the shaft 32 and axially abuts the end of the laminated core 76. A radial inward extending lip 90 is provided around the outer axial end of the support ring 82 so as to overhang the radial flange portion 88. Accordingly, an annular reservoir or oil dam is formed on each of the inner peripheries of the coil support rings 82 and 84 for containing an annular pool of liquid coolant as described further hereinbelow.

The coil support rings 82 and 84 are held against the ends of the laminated core 76 by a spanner nut 94 which clamps an insulator ring 96 and a spacer block 98 against the flange portion 88 of the coil support ring 82 and to one end of the laminated core 76. As shown in FIG. 1, the other end of the laminated core 76 is pressed against the coil support ring 84 which engages an annular shoulder 104 formed on the shaft 32. Wire leads, not shown, extend from the exciter output winding 78 through openings in the ring extension 86 over the insulating ring 96 and radially through the spacer block 98 and then through axial holes, not shown, in the shaft 32 which terminate at the rectifier assembly 12.

The main generator rotor 74 includes a laminated core 108 supporting the main generator field winding 110. The laminated core 108 is mounted on a cylindrical sleeve 112 made of a low carbon steel having an interference fit on the shaft 32. The cylindrical sleeve 112 is mounted on the shaft in a heat shrinking operation causing the sleeve to be radially expanded so as to press outward against the inner bore of the laminated core 108. The ends of the sleeve 112 are welded to the shaft 32.

The axial ends of the laminated core 108 are clamped between a pair of cylindrical rings 114 and 116 which are welded to a pair of spacer blocks 118 and 120, respectively. The spacer blocks 118 and 120 secure the cylindrical rings 114 and 116 in place by being welded to the ends of the cylindrical sleeve 112. Since the laminations forming the laminated core 108 are not otherwise secured together, the cylindrical rings 114 and 116 prevent axial shifting of the laminated core 108.

The cylindrical rings 114 and 116 are mounted adjacent the bottom of the winding slots of the core 108 to also provide support of the coil end turns of the field winding 110. A circumferential banding of glass insulating tape is provided around the outer diameter of the coil end turns. Electrical connections to the main generator field winding 110 are provided by wire leads, not shown, extending axially through the shaft 32 to the rectifier assembly 12.

Figure 7:
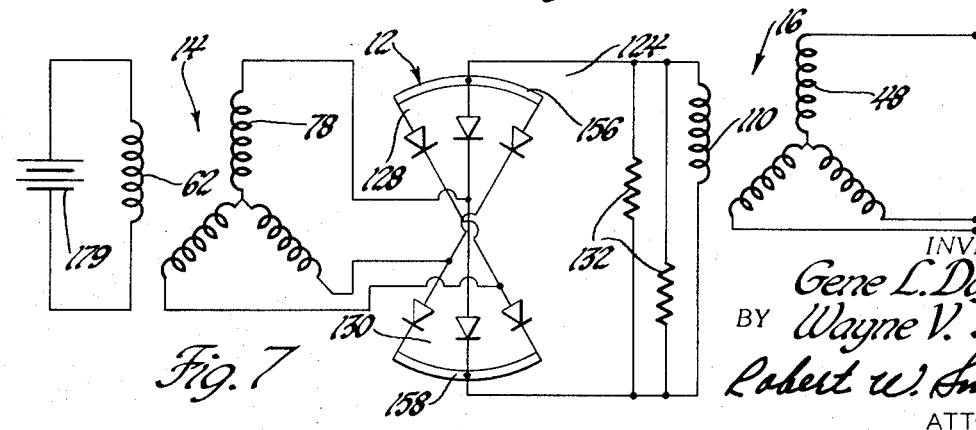
FIG. 7 is a schematic circuit diagram illustrating the electrical circuit provided in the generator of FIG. 1.

The rectifier assembly 12 shown in further detail in FIGS. 2, 3 and 4, includes a three-phase full wave bridge rectifier circuit 124, illustrated in FIG. 7, for developing DC field excitation current supplied to the main generator field winding 110 from the exciter output winding 78. A rectifier support wheel 126, secured to the end of shaft end 34 carries the rectifier circuit 124 which includes two groups of rectifier devices designated 128 and 130 and surge suppressor resistors 132 illustrated in FIG. 4. The support wheel 126 is generally circular and includes a thin rim 134 which is formed integral with a solid radial side 136 terminating in a hub 138. Bolts 140 extending axially through the hub 138 are applied to threaded openings in the shaft 32. The opposite side of the support wheel 126 is partially enclosed by an annular side plate 142 having a center circular opening 144 formed around the inner edge thereof The outer edge of the side plate 142 is secured to the rim 134 by bolts 146 with a thin ring of insulating material 148 being positioned between the side plate 142 and the rim 134. As thus described, the support wheel 126 has a hollow interior including an annular chamber 150 formed between the side plate 142 and the radial side 136 and the inner surface of the rim 134.

The two groups of rectifier devices 128 and 130 each include three semiconductor diodes of the type having a ceramic casing 152, a first terminal provided by a threaded stud 154 at one end of the casing 152 and a second terminal provided by a lug terminal 155 extending from the opposite end of the casing 152. The terminals 154 and 155 are oppositely poled and the terminals of the semiconductor diodes included in each of the groups of rectifier devices 128 and 130 are oppositely poled to the terminals of the other group. Thus, the stud terminals 154 of the rectifier group 128 have a positive polarity and the stud terminals 154 of the rectifier group 130 have a negative polarity.

The two groups of rectifier devices 128 and 130 are carried by a pair of aluminum heat sink members 156 and 158, respectively. The heat sink members are generally arcuate and include three flat support areas 159 each extending perpendicularly to a radial axis line from the center axis 160 of the support wheel that is also the axis of rotation. The stud terminals 154 are mounted to threaded holes of the support areas 159 so that the radial axis lines include both the terminals 154 and 155 of each rectifier device. The axial sides of the heat sink members include radiating fins 161. The heat sinks 156 and 158 are mounted diametrically opposite on insulator blocks 162 and 164 respectively by means of bolts 166. These bolts may be mounted through openings 168 extending radially through the rim 134. In turn, the insulator blocks 162 and 164 are secured to the inner surface of the rim 134 by means of screws, not shown, extending through the rim and applied to threaded openings in the insulator blocks. A suitable sealant coats the engaging surfaces of the insulator blocks 162 and 164 and the rim 134 adjacent the holes 168 to form a liquidtight seal.

It is important that the semiconductor diodes included in the two groups of rectifier devices 128 and 130 are disposed radially relative to the center of the support wheel 126. When the shaft 32 is rotated at high speeds the centrifugal forces developed on the semiconductor diodes tend to compress the semiconductor diodes radially outward along their elongated axis extending through the oppositely disposed terminals thereof. If the semiconductor diodes were disposed within the hollow support wheel 132 with other than a radial orientation, lateral forces would be exerted on the wafers of semiconductor material mounted within the diode casings 152 causing damage to the wafers. As described more fully hereinbelow, the lug terminals 155 of the rectifier devices are connected through the lead wires connected with the exciter output winding 78. The heat sinks 156 and 158 form the two outputs of the rectifier circuit 124 and are respectively connected through bridge output terminals 170 and 172 to the lead wires connected with the main generator field winding.

The surge suppression resistors 132, shown in FIG. 4, are mounted in two groups each including eight resistors axially extending between the annular side plate 142 and radial side 136 of the support wheel 126. Each group of resistor is disposed on a circular arc extending between the heat sinks 156 and 158. The resistors 132 are hollow and are mounted on studs 174 having threaded ends secured to the plate 142 and side 136 by nuts 176. The opposite ends of the resistors 132 are insulated from the support wheel 126 by two pieces of insulation 178. The mounting of the two groups of rectifier devices 128 and 130 and the resistors 132 provides a balanced assembly for the support wheel 126. The resistors 132 are connected together and across the heat sinks 156 and 158 as described in connection with FIG. 7 hereinafter.

Before describing the cooling system of this inventioN the electrical system of the dynamoelectric machine 10 is now described with reference to FIG. 7. The exciter field winding 62 is connected to a source of direct current furnished by a battery 179 as is provided in the electrical system of a vehicle. A nominal 24 volts is applied to the exciter field winding 62 to develop a three-phase output voltage in the exciter output winding 78 as the shaft 32 is rotated.

The voltage produced in the exciter output winding 78 is approximately 110 volts and is applied to the semiconductor diodes of the bridge rectifier circuit 124. The two groups of rectifier devices 128 and 130 are arranged with three pairs of series connected semiconductor diodes formed between the heat sinks 156 and 158 and with the junction of each pair connected to one phase of the exciter output winding 78. The direct current output voltage of the rectifier circuit 124 is applied across the main generator field winding 110 with the resistors 132 being connected across the output of the rectifier circuit 124 to suppress the level of transient power surges.

The shaft 32 is normally driven at a speed of 6,300 r.p.m. and the main generator output winding 48 is capable of developing 200 kva. of alternating current power at a frequency of 1,260 c.p.s. to supply AC induction traction motors driving the wheels of a heavy duty or earth moving type of vehicle. The load voltage and current of the machine 10 may vary somewhat since traction motors are operated over wide speed and torque ranges as well known in electric traction systems.

Referring now more particularly to the cooling arrangement of the dynamoelectric machine 10, the shaft 32 includes a first axial bore 180 extending into the shaft end 34 and terminating at an axial position which is radially adjacent one end of the main generator rotor 74. A second axial bore 182 which is coaxially aligned with the first axial bore 180 extends into the shaft end 36 and terminates at an axial position adjacent the other end of the rotor 74. Four radial shaft passages 184 extend from the closed end of the first axial bore 180 to the outer surface of the shaft 32. Similarly, four radial shaft passages 186 extend from the closed end of the second axial bore 182 to the outer surface of the shaft 32. Accordingly, the radial passages 184 and 186 extend radially to axial locations at opposite ends of the rotor 74 so as to communicate with a series of axial grooves 188 formed around the outer diameter of the shaft 32 adjacent the center of the cylindrical sleeve 112. The spaces between the sleeve 112 and the grooves 188 form a plurality of cooling channels 190 fluidly connecting the first axial bore 180 through the radial passages 184 with the second axial bore 182 through the radial passages 186.

Two additional sets of radial passages 192 and 194 extend between the first axial bore 180 and the outer surface of the shaft 32 and are axially located so as to be aligned with the coil support rings 82 and 84, respectively. The spacer block 98 extends over the passages 192 and includes holes 196 communicating with the passages 192. Thus, the passages 192 and 194 terminate in spaced relationships adjacent the inner peripheries of the coil support rings 82 and 84.

A tubular coupling 198, illustrated in the enlarged view of FIG. 3, provides an axial extension of the first axial bore 180 that is journaled for rotation in a center opening 199 of the housing end cover 38. An inlet cap 200 mounted on the center of the end cover includes an inner opening 202 which receives the tubular coupling 198 and an external coolant inlet opening 204. A small chamber 206 is formed inside the inlet cap 200 between the openings 202 and 199. A spray nozzle 207 aligned with the interior of the support wheel 126 is included in the inlet cap 200 so as to communicate with the chamber 206.

The ends of the tubular coupling 198 include universally movable mountings 208 and 210. These permit the ends of the tubular coupling to be adjusted to connect the opening 199 with the open end of the first axial bore 180 which may be slightly out of mutual coaxial alignment. The universal mounting 208 at the inlet cap end of the tubular coupling 198 includes a sleeve bearing 212 having an outer spherical surface which is mounted within a complementary shaped bearing seat provided at the opening 199. The inner surface of the sleeve bearing 212 is mounted over the outer end of the tubular coupling 198 with a tight rotational fit provided therebetween. The engaging surfaces between the sleeve bearing 212 and tubular coupling 198 are substantially sealed when the shaft 32 is rotating by the hydrodynamic pressures developed in the film of liquid coolant therebetween. An annular flange 214 is provided around the coupling 198 which will engage the sleeve bearing 212 to prevent axial movement toward the chamber 206.

The universal mounting 210 at the shaft entering end of the tubular coupling 198 includes an increased diameter section formed by an annular boss 216 having a convex arcuate cross section. An annular groove 218 formed in the center of the annular boss 216 supports an O-ring shaft seal 220 which engages the sides of the first axial bore 180 so that a substantially liquidtight seal is formed therebetween. The terminal end of the tubular coupling 198 which extends inside the axial bore 180 includes a pair of diametrically disposed slots 222. Opposing sides of the slots 222 engage a dowel pin 224 extending transversely through the shaft and across the center of the axial bore 180. The pin 224 is urged against the sides of the slots 222 when the shaft 32 rotates to turn the tubular coupling 198 within the bearing sleeve 212. The ends of the slots 222 limit axial movement of the tubular coupling 198 toward the interior of the axial bore 180.

As thus described, a coolant flow circuit is provided in the shaft 32 which begins at the coolant inlet opening 204 of the inlet cap 200 to supply a liquid coolant into the chamber 206 and to the tubular coupling 198 and the spray nozzle 207. The tubular coupling 198 carries coolant flow into the first axial bore 180 which supplies the radial passages 192, 194 and 184. The coolant flow through the radial passages 184 continues through the cooling channels 190, the radial passages 186 and to the second axial bore 182.

In addition to the shaft cooling circuit noted above, cooling systems which do not form a part of the present invention are provided for the bearing assemblies 26 and 28 and the main generator field and output windings 110 and 48. For example, spray nozzles 230 and 232 are disposed adjacent bearing assemblies 26 and 28 and spray nozzles 234 and 236 are disposed at opposite ends of the main generator rotor 74. The spray nozzles 230 and 232, 234 and 236 direct spray of liquid coolant in an arrangement somewhat similar to that disclosed in the aforementioned U.S. Pat. No. 3,239,709. A cooling system for the main generator stator 44 is provided by a flow of liquid coolant filling the chamber 56 which is connected to a supply of liquid coolant along with the spray nozzles and the axial bores 180 and 182 as described hereinafter with reference to FIG. 6.

Figure 6:
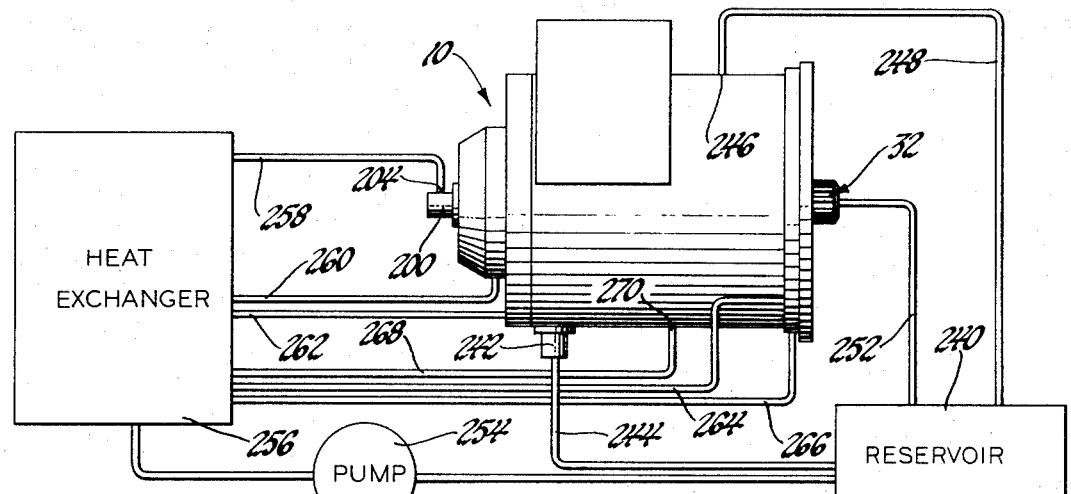
FIG. 6 is a schematic diagram illustrating an external cooling circuit connected to the generator shown in FIG. 1.

A suitable liquid coolant such as an oil coolant is supplied to a dynamoelectric machine 10 by the external cooling circuit arrangement schematically illustrated in FIG. 6. A coolant reservoir 240 is connected to coolant outlets provided in the machine 10. A drain outlet 242 communicating with the main interior portion of the annular frame 18 is connected to the reservoir 240 by conduit 244. A coolant outlet 246 communicating with the annular chamber 56 is connected to the reservoir 240 by conduit 248. The reservoir 240 is also connected by a conduit 252 to the second axial bore 182 which provides an outlet for the cooling circuit included in the shaft 32.

The reservoir 240 is connected to a pump 254 which circulates the liquid coolant through a heat exchanger device 256. The liquid coolant delivered to the reservoir 240 is at elevated temperatures due to the heat absorbed therein during circulation through the dynamoelectric machine 10. The heat exchanger 256 cools the liquid coolant whereupon it is recirculated through the machine as described more fully hereinbelow. Several conduits are provided between the heat exchanger 256 and inlets provided in the dynamoelectric machine 10. Conduit 258 supplies liquid coolant to the inlet cap 200 and the conduits 260, 262, 264 and 266 supply the liquid coolant to inlets and passages provided in the annular frame 18 and communicating with the aforementioned spray nozzles 230, 232, 234 and 236. Conduit 268 connects the heat exchanger 256 with an inlet 270 communicating with annular chamber 56. Thus, a separate cooling circuit for the annular chamber 56 is provided between conduits 268 and 248.

Referring now more particularly to the cooling circuit including the support wheel 126 and the coil support rings 82 and 84 which are mounted on the shaft 32. Liquid coolant is supplied to the inlet opening 204 and the chamber 206 which provides the source of coolant for the spray nozzle 207. A spray of liquid coolant is directed through opening 144 and into the hollow interior of the support wheel 126. Some initial diode cooling is provided as the coolant spray contacts the groups of rectifier devices 128 and 130, and then fills the chamber 150 within the support wheel 126. Centrifugal forces due to the rotation of the shaft 32 develop an annular pool of liquid coolant, designated by numeral 276 in FIGS. 1 and 3, which surrounds the pair of heat sinks 156 and 158. The heat developed in the semiconductor diodes forming the rectifier devices is transferred to the heat sinks 156 and 158 which in turn are cooled by the annular pool of coolant 276. The liquid coolant being sprayed from the spray nozzle 207 has a higher density because of its lower temperature whereby the centrifugal forces cause the cooler liquid coolant to circulate radially outward toward the bottom of the chamber 150 adjacent the rim 134. This causes the liquid coolant which has been heated by the heat transferred from the heat sinks 156 and 158 to float toward the radially inward surface of the annular pool of coolant 276 since it has a lower density. The heated coolant is thereby discharged out the opening 144 of the hollow support wheel 126 by a thermal-siphoning effect and into the bottom of the frame 18.

The liquid coolant also flows from the chamber 206 through the tubular coupling 198 and into the first axial bore 180 at a rate of approximately 6½ gallons per minute. A flow of approximately ½ gallon per minute is applied through the radial passages 192 and 194 so that liquid coolant is directed toward the annular reservoirs provided on the inner peripheries of the coil support rings 82 and 84. As the shaft rotates, annular pools of liquid coolant 278 and 280 are formed within these annular reservoirs so that heat is transferred thereto from the exciter output winding 78 and the laminated core 60. The liquid coolant in the annular pools 278 and 280 is displaced by the incoming liquid coolant directed into the two reservoirs from the radial passages 192 and 194. The displaced liquid coolant flows over lip 90 of each of the coil support rings 82 and 84 and falls to the bottom of the annular frame 18 to be discharged into the reservoir 240 along with the liquid coolant sprayed from the spray nozzles 207, 230, 232, 234 and 236.

The remaining liquid coolant in the first axial bore 180 then passes through the four radial passages 184 at the end of the first axial bore and along the outer circumference of the shaft 32 including the cooling channels 190 formed by the axial grooves 188. The laminated core 108 and shaft 32 act as heat sinks for conducting heat which is generated in the main generator field winding 110. This heat is transferred to the liquid coolant that flows through the cooling channels 190. The liquid coolant then passes radially inward through the radial passages 186 at the end of the second axial bore 182 and then flows out the outer end thereof and into the conduit 252 connected with the reservoir 240.

While the embodiment of the present invention as herein disclosed constitutes a preferred form, it is to be understood that other forms may be adopted.

What is claimed is as follows:

1. A cooling arrangement for cooling the rotor of a dynamoelectric machine including a laminated core carrying a winding having circumferentially disposed coil end turns extending axially from the opposite ends thereof, comprising: opposite end frame sections having shaft support openings; a shaft rotatably mounted within said shaft support openings and carrying said rotor, said shaft including an axial bore for conducting a flow of liquid coolant and first and second sets of radially disposed cooling passages communicating with said bore and the exterior of said shaft, said first and second sets of radial cooling passages being radially aligned with said coil end turns of said winding for directing a flow of liquid coolant towards said end turns; a pair of coil end turn support rings carrying the inner diameter of said end turns, said support rings including radial flange portions carried by said shaft and axially abutting the opposite ends of said laminated core, and said support rings further including an annular lip extending radially inwardly from an inner periphery thereof in an overhanging relationship with said flange portion so as to form an annular reservoir in a radially facing relationship with one of said first and second radial cooling passages; and clamping means including a nut threaded to said shaft to hold said support rings against said opposite ends of said laminated core whereby liquid coolant flow directed from said first and second radial cooling passages forms circulating annular pools of liquid coolant within said reservoirs when said shaft is rotating so as to conduct heat from said support rings that is conducted from said coil end turns and said opposite ends of said laminated core.

2. A cooling arrangement for a dynamoelectric machine including first and second rotor assemblies carrying windings electrically interconnected by a rectifier assembly including first and second groups of oppositely poled rectifier devices, said arraNgement comprising: a rotatable shaft carrying said first and second rotor assemblies; a rectifier support wheel including a rim and a pair of side portions extending radially inward from said rim to form an annular chamber therebetween, one of said side portions terminating in a hub member mounted on said shaft and the other of said side portions including an annular opening forming an entry to said annular chamber; first and second heat sink members mounted on said rim and within said annular chamber of said support wheel, each of said heat sink members including support areas aligned with the center axis of said support wheel and having one of said first and second groups of rectifier devices mounted thereon, whereby the rectifier devices in each of said groups are radially aligned with said center axis of said support wheel; and a nozzle means mounted adjacent said other side portion of said rectifier support wheel for directing a flow of liquid coolant through said annular opening and into said annular chamber whereby said heat sinks are immersed in an annular pool of liquid coolant which circulates in said annular chamber when said shaft is rotated.

3. A cooling arrangement for a dynamoelectric machine including first and second rotor assemblies carrying windings and a rectifier assembly including first and second groups of oppositely poled semiconductor rectifier devices electrically connecting said windings of said first and second rotor assemblies, said arrangement comprising a housing including a liquid coolant inlet; a shaft mounted for rotation in said housing and carrying said first and second rotor assembles a rectifier support wheel including a rim and a pair of side portions extending radially inward from said rim to form an annular chamber therebetween, one of said side portions terminating in a hub member mounted on one end of said shaft and the other of said side portions including an annular opening forming an entry to said annular chamber; first and second heat sink members mounted in diametrically opposing relationship on said rim and within said annular chamber of said support wheel, each of said heat sink members including plural support areas having a common electrically conductive relationship and each being disposed at an angle relative to the other support areas so as to be aligned with the center axis of said support wheel, said support areas having one of said first and second groups of semiconductor rectifier devices mounted thereon so that the oppositely poled terminals of each of said rectifier devices is radially aligned with said center axis of said support wheel; and a spray nozzle means mounted adjacent said other side portion of said rectifier support wheel and communicating with said liquid coolant inlet for directing a flow of liquid coolant through said annular opening and into said annular chamber whereby said heat sinks are immersed in an annular pool of liquid coolant which circulates in said annular chamber when said shaft is rotated.

* * * * *